(12) United States Patent
Park

(10) Patent No.: US 10,007,384 B2
(45) Date of Patent: Jun. 26, 2018

(54) TOUCH SCREEN PANEL

(71) Applicant: SAMSUNG DISPLAY CO., LTD., Yongin, Gyeonggi-Do (KR)

(72) Inventor: Jungmok Park, Hwaseong-si (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 62 days.

(21) Appl. No.: 14/618,210

(22) Filed: Feb. 10, 2015

(65) Prior Publication Data
US 2016/0048246 A1 Feb. 18, 2016

(30) Foreign Application Priority Data
Aug. 14, 2014 (KR) .................. 10-2014-0106126

(51) Int. Cl.
*G06F 3/041* (2006.01)
*G06F 3/044* (2006.01)

(52) U.S. Cl.
CPC ............ *G06F 3/044* (2013.01); *G06F 3/0416* (2013.01)

(58) Field of Classification Search
CPC .............................. G06F 3/0416; G06F 3/044
USPC .......... 345/173, 174, 175; 361/749; 349/112
See application file for complete search history.

(56) References Cited

U.S. PATENT DOCUMENTS

| | | | |
|---|---|---|---|
| 8,440,920 B2 | 5/2013 | Bulea et al. | |
| 2008/0252612 A1* | 10/2008 | Yu | G06F 3/045 345/173 |
| 2012/0057312 A1* | 3/2012 | Yoo | G06F 3/041 361/749 |
| 2014/0152618 A1* | 6/2014 | Ando | G06F 3/044 345/174 |
| 2014/0225869 A1* | 8/2014 | Hsu | G06F 3/044 345/175 |
| 2014/0300833 A1* | 10/2014 | Yang | G06F 3/044 349/12 |

FOREIGN PATENT DOCUMENTS

| | | |
|---|---|---|
| CN | 102169397 A | 8/2011 |
| JP | 2006-276359 A | 10/2006 |
| JP | 2013-054372 A | 3/2013 |
| KR | 10-2014-0022584 A | 2/2014 |

* cited by examiner

*Primary Examiner* — Kumar Patel
*Assistant Examiner* — Kuo Woo
(74) *Attorney, Agent, or Firm* — Lee & Morse P.C.

(57) ABSTRACT

A touch screen panel includes a touch recognition area that recognizes a touch input and a non-recognition area that does not recognize the touch input. The touch recognition area includes first touch electrodes connected in a first direction and second touch electrodes connected in a second direction orthogonal to the first direction. The non-recognition area includes a driver that obtains coordinate information of the touch input by using the first and second touch electrodes and outer wires connecting the first and second touch electrodes and the driver.

20 Claims, 8 Drawing Sheets

TOUCH SCREEN PANEL

CROSS-REFERENCE TO RELATED APPLICATION

Korean Patent Application No. 10-2014-0106126, filed on Aug. 14, 2014, in the Korean Intellectual Property Office, and entitled: "Touch Screen Panel," is incorporated by reference herein in its entirety.

BACKGROUND

1. Field

Embodiments relate to a touch screen panel, and more particularly, to a touch screen panel including a non-rectangular touch recognition area.

2. Description of the Related Art

A touch screen panel is a panel equipped at a display device to detect a user input using a user's body and/or a stylus pen.

The touch screen panel is equipped at the front of a display device and converts a contact on the display device using a user's body and a stylus pen into electrical signals. Accordingly, the display device detects a user input to the front and executes a command corresponding to a corresponding input.

A resistive layer method, an optical detection method, and a capacitive method are known methods for realizing a touch screen panel.

When a user' body or a stylus pen contacts a touch screen panel, a capacitive touch screen panel converts a contact position into electrical signals by detecting a change in capacitance, which is caused by a conductive touch electrode and another adjacent touch electrode or a ground electrode. A display device detecting a converted electrical signal may execute a command corresponding to a contact position by detecting the contact position of a user's body or a stylus pen contacting on the display device.

Recently, as development of a wearable device increases, various forms of touch screen panels are in demand. Accordingly, a touch screen panel structure reducing a coupling interference between touch input signals without restriction to various form deformations is required.

SUMMARY

One or more embodiments provide touch screen panels, wherein the touch screen panel includes a touch recognition area recognizing a touch input and a non-recognition area not recognizing the touch input, wherein the touch recognition area includes first touch electrodes connected in a first direction and second touch electrodes connected in a second direction orthogonal to the first direction. The non-recognition area includes a driving unit obtaining coordinate information of the touch input by using the first and second touch electrode, and outer wires connecting the first and second touch electrodes and the driving unit. The touch recognition area is divided into first to fourth areas on the basis of a first reference line passing a weight center of the touch recognition area and divided in the first direction and a second reference line passing the weight center and divided in the second direction, the first and third area facing each other on the basis of the weight center and the second and fourth area facing each other on the basis of the weight center. The outer wires include first outer wires connecting first outermost touch electrodes at the outermost of the first and third area among the first touch electrodes and the driving unit, and second outer wires connecting second outermost touch electrodes at the outermost of the second and fourth area among the second touch electrodes and the driving unit.

In some embodiments, boundaries of the touch screen area may be not parallel to the first and second reference line.

In other embodiments, the touch recognition area may have one of a circular form, an oval form, a rhombic form, and a hexagonal form.

In still other embodiments, the panels may further include: first connection parts connecting the first touch electrodes in the first direction; and second connection parts connecting the second touch electrodes in the second direction.

In even other embodiments, first touch electrodes connected by the first connection parts may be arranged in the second direction; and second touch electrodes connected by the second connection parts may be arranged in the first direction.

In yet other embodiments, the first or second direction may be or may be not parallel to an imaginary line connecting a weight center of the driving unit and the weight center of the touch recognition area.

In further embodiments, the second touch electrodes, the first connection parts, and the first touch electrode are disposed on the same layer; and the first connection part and the first and second touch electrodes may be covered by a blocking layer.

In still further embodiments, the second connection parts may be disposed on the blocking layer and the second touch electrodes may be connected in the second direction through contact holes penetrating the blocking layer.

In even further embodiments, first touch electrodes connected by the first connection parts and second touch electrodes connected by the second connection parts may be disposed on different layers.

In yet further embodiments, the driving unit may include a first driving chip transmitting scan signals to the first touch electrodes and receiving detection signals corresponding to the scan signals from the second touch electrodes.

In yet further embodiments, the first outer wires may connect the first outermost touch electrodes and the first driving chip and the second outer wires may connect the second outermost touch electrodes and the first driving chip.

In yet further embodiments, the driving unit further may include a second driving chip disposed at a different position than the first driving chip in the non-recognition area.

In yet further embodiments, the first driving chip and the second driving chip may face each other on the basis of the touch recognition area.

In yet further embodiments, first outer wires of the first area and second outer wires of the second area may be connected to the first driving chip at a position adjacent to the first and second area; and first outer wires of the third area and second outer wires of the fourth area may be connected to the second driving chip at a position adjacent to the third and fourth area.

In yet further embodiments, a length of the first or second outermost touch electrode may be greater than or identical to ½ of a length of a first or second touch electrode not disposed at the outermost of the first to fourth areas.

BRIEF DESCRIPTION OF THE DRAWINGS

Features will become apparent to those of ordinary skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

Figure 1:
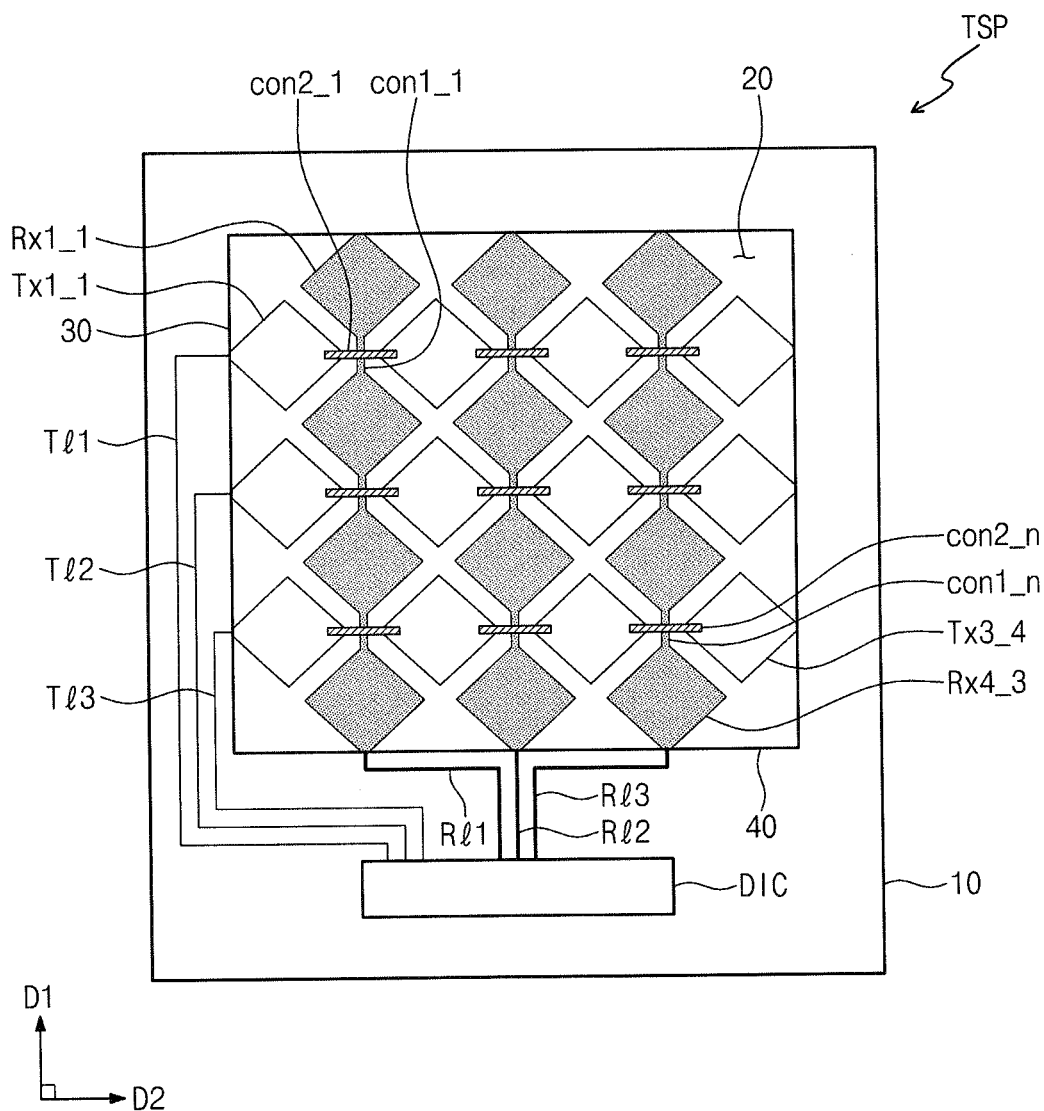
FIG. 1 illustrates a plan view of a touch screen panel.

FIG. 1 is a plan view of a touch screen panel TSP. Referring to FIG. 1, the touch screen panel TSP includes a touch recognition area 20 that recognizes a touch input and a non-recognition area 10 that does not recognize a touch input. The touch recognition area 20 is an area capable of recognizing a touch input and the non-recognition area 10 is an area not capable of recognizing a touch input. A touch input referred to in this specification may include an input by a user's body contact on the touch recognition area 20 and/or an input by a touch input tool (for example, a stylus pen).

The touch recognition area 20 may include first touch electrodes Rx1_1 to Rx4_3, first connection parts con1_1 to con1_n connecting the first touch electrodes Rx1_1 to Rx4_3, second touch electrodes Tx1_1 to Tx3_4, and second connection parts con2_1 to con2_n connecting the second touch electrodes Tx1_1 to Tx3_4.

The first touch electrodes Rx1_1 to Rx4_3 may be connected in a first direction D1 by the first connection parts con1_1 to con1_n. The first touch electrodes Rx1_1 to Rx4_3 connected in the first direction D1 may be arranged in a second direction D2 on the touch recognition area 20. Herein the second direction D2 is vertical (orthogonal) to the first direction D1.

The second touch electrodes Tx1_1 to Tx3_4 may be connected in the second direction D2 by the second connection parts con2_1 to con2_n. The second touch electrodes Tx1_1 to Tx3_4 connected in the second direction D2 may be arranged in the first direction D1 on the touch recognition area 20.

Accordingly, the first and second touch electrodes Rx1_1 to Rx4_3 and Tx1_1 to Tx3_4 may be disposed intersecting each other on the touch recognition area 20. The first and second touch electrodes Rx1_1 to Rx4_3 and Tx1_1 to Tx3_4 arranged in such a way may be capacitively coupled to each other. As a result, as scan signals are transmitted from a driving unit DIC to the first touch electrodes Rx1_1 to Rx4_3, a capacitor may be formed between the first and second touch electrodes Rx1_1 to Rx4_3 and Tx1_1 to Tx3_4. The capacitively coupled first and second touch electrodes Rx1_1 to Rx4_3 and Tx1_1 to Tx3_4 may detect a touch input to the touch screen panel TSP according to a mutual capacitance method.

In more detail, the first touch electrodes Rx1_1 to Rx4_3 may receive scan signals from the driving unit DIC. The second touch electrodes Tx1_1 to Tx3_4 may transmit detect signals respectively corresponding to the received scan signals to the driving unit DIC. If a touch input occurs on the touch recognition area 20, a capacitance may change between the first and second touch electrodes Rx1_1 to Rx4_3 and Tx1_1 to Tx3_4. Due to such a capacitance change, a detect signal transmitted from the second touch electrodes Tx1_1 to Tx3_4 may be delayed. The driving unit DIC may obtain coordinate information of a touch input on the basis of a delayed value of the received detection signals.

The first and second touch electrodes Rx1_1 to Rx4_3 and Tx1_1 to Tx3_4 may be disposed on the same layer or a different layer.

When the first and second touch electrodes Rx1_1 to Rx4_3 and Tx1_1 to Tx3_4 are disposed on the same layer, the first connection parts con1_1 to con1_n and the second connection parts con2_1 to con2_n may be disposed on different layers. For example, the first touch electrodes Rx1_1 to Rx4_3, the first connection parts con1_1 to con1_n, and the second touch electrodes Tx1_1 to Tx3_4 may be disposed on the same layer, and the second connection parts con2_1 to con2_n may be disposed on another layer. In this case, the first touch electrodes Rx1_1 to Rx4_3, the first connection parts con1_1 to con1_n, and the second touch electrodes Tx1_1 to Tx3_4 may be covered by a blocking layer. The second connection parts con2_1 to con2_n may be disposed on the blocking layer. The second connection parts con2_1 to con2_n connect the second touch electrodes Tx1_1 to Tx3_4 in the second direction D2 through contact holes penetrating the blocking layer.

For another example, the first and second touch electrodes Rx1_1 to Rx4_3, Tx1_1 to Tx3_4, and the second connection parts con2_1 to con2_n may be disposed on the same layer and the first connection parts con1_1 to con1_n may be disposed on another layer. In such a case, the first connection parts con1_1 to con1_n are disposed on the blocking layer covering the first and second touch electrodes Rx1_1 to Rx4_3, Tx1_1 to Tx3_4, and the second connection parts con2_1 to con2_n so that they may connect the first connection parts con1_1 to con1_n in the first direction D1.

When the first and second touch electrodes Rx1_1 to Rx4_3, Tx1_1 to Tx3_4 are disposed on different layers, the first and second connection parts con1_1 to con1_n and con2_1 to con2_n may be disposed on different layers. For example, the first touch electrodes Rx1_1 to Rx4_3 and the first connection parts con1_1 to con1_n may be disposed on a first layer, and the second touch electrodes Tx1_1 to Tx3_4 and the second connection parts con2_1 to con2_n may be disposed on a second layer. In this case, the first layer and the second layer may be disposed with the blocking layer therebetween.

The non-recognition area 10 includes the driving unit DIC that obtains coordinate information of a touch input by using the first and second touch electrodes Rx1_1 to Rx4_3 and Tx1_1 to Tx3_4 and outer wires Rl1 to Rl3 and Tl1 to Tl3 connecting the first and second touch electrodes Rx1_1 to Rx4_3 and Tx1_1 to Tx3_4 to the driving unit DIC.

The driving unit DIC may transmit scan signals to the first touch electrodes Rx1_1 to Rx4_3. Additionally, the driving unit DIC may receive detect signals respectively corresponding to the transmitted scan signals from the second touch electrodes Tx1_1 to Tx3_4. The driving unit DIC may obtain coordinate information of a touch input on the basis of a delay value of the detection signals received from the second touch electrodes Tx1_1 to Tx3_4. Additional details are the same as the above relating to the first and second touch electrodes Rx1_1 to Rx4_3 and Tx1_1 to Tx3_4.

The driving unit DIC may include at least one driving chip. At least one driving chip may be disposed on the non-recognition area 10 relative to the touch recognition area 20. For example, when the driving unit DIC includes first and second driving chips, the first and second driving chips may be disposed in the non-recognition area 10 to face each other on the basis of the touch recognition area 20. A detailed description of this will be provided below with reference to FIGS. 3 and 5.

The outer wires Rl1 to Rl3 and Tl1 to Tl3 may connect the first or second touch electrodes Rx1_1 to Rx4_3 or Tx1_1 to Tx3_1 and the driving unit DIC. In particular, the outer wires Rl1 to Rl3 and Tl1 to Tl3 may connect the first or second touch electrodes Rx1_1 to Rx4_3 or Tx1_1 to Tx3_1 at the outermost of the touch recognition area 20 and the driving unit DIC. Herein, the outermost touch electrodes Rx4_1 to Rx4_3 and Tx1_1 to Tx3_1 may represent touch electrodes adjacent to the boundaries 30 and 40 of the touch recognition area 20 among the connected touch electrodes Rx1_1 to Rx4_3 and Tx1_1 to Tx3_1. Accordingly, as the outer wires Rl1 to Rl3 and Tl1 to Tl3 connect the first or second touch electrodes Rx1_1 to Rx4_3 or Tx1_1 to Tx3_1 and the driving unit DIC, all the touch electrodes Rx1_1 to Rx4_3 and Tx1_1 to Tx3_1 in the touch recognition area 20 may be electrically connected to the driving unit DIC. The reason is that the first touch electrodes Rx1_1 to Rx4_3 are mutually connected to each other by the first connection parts con1_1 to con1_n and the second touch electrodes Tx1_1 to Tx3_4 are mutually connected to each other by the second connection parts con2_1 to con2_n.

The outer wires Rl1 to Rl1 and Tl1 to Tl3 may include first outer wires Rl1 to Rl3 connecting the first outermost touch electrodes Rx4_1, Rx4_2, and Rx4_3 and the driving unit DIC, and second outer wires Tl1 to Tl3 connecting the second outermost electrodes Tx1_1, Tx2_1, and Tx3_1 and the driving unit DIC. When the first outer wires Rl1 to Rl3 and the second outer wires Tl1 to Tl3 are disposed adjacent to each other on the non-recognition area 10, a capacitance may be formed between the first and second outer wires Rl1 to Rl3 and Tl1 to Tl3. As a result, a coupling phenomenon between the first and second outer wires Rl1 to Rl3 and Tl1 to Tl3 may occur, deteriorating touch sensitivity. Therefore, the first and second outer wires Rl1 to Rl3 and Tl1 to Tl3 are disposed to minimize the coupling phenomenon.

Accordingly, as shown in FIG. 1, the first outer wires Rl1 to Rl3 may connect the first outermost touch electrodes Rx4_1, Rx4_2, and Rx4_3 adjacent to the second boundary 40 of the touch recognition area 20 and the driving unit DIC and the second outer wires Tl1 to Tl3 may connect thee second outermost touch electrodes Tx1_1, Tx2_1, and Tx3_1 adjacent to the first boundary 30 of the touch recognition area 20 and the driving unit DIC. Since outer wires performing the same function are disposed together, the coupling phenomenon may be minimized.

However, the arrangement of the outer wires Rl1 to Rl3 and Tl1 to Tl3 is not readily applied to various forms of the touch recognition area 20. In particular, the arrangement scheme of the outer wires Rl1 to Rl3 and Tl1 to Tl3 may not be easily applied to the touch recognition area 20 boundaries 30 and 40 that are not parallel to a direction that the first or second touch electrodes Rx1_1 to Rx4_3 or Tx1_1 to Tx3_1 are connected. Examples of such forms include a circular form, an oval form, a rhombic form, a hexagonal form, and so forth. When the boundaries 30 and 40 forming the touch recognition area 20 are not parallel to the first or second direction D1 or D2, if the arrangement scheme of the outer wires Rl1 to Rl3 and Tl1 to Tl3 shown in FIG. 1 is used, the coupling phenomenon may occur.

For example, referring to FIG. 1, the first boundary 30 of the rectangular touch recognition area 20 is parallel to the first direction D1 and the second boundary 40 is parallel to the second direction D2. As a result, when only the second outermost touch electrodes Tx1_1, Tx2_1, and Tx3_1 adjacent to the first boundary 30 are connected to the second outer wires Tl1 to Tl3, all the second touch electrodes Tx1_1 to Tx3_4 in the touch recognition area 20 may be electrically connected to the driving unit DIC. Additionally, when only the first outermost touch electrodes Rx4_1, Rx4_2, and Rx4_3 adjacent to the second boundary 40 are connected to the first outer wires Rl1 to Rl3, all the first touch electrodes Rx1_1 to Rx4_3 in the touch recognition area 20 may be electrically connected to the driving unit DIC.

However, when the arrangement scheme is applied to the touch recognition area 20 having boundaries that are not parallel to the first or second directions D1 and D2, a plurality of areas where the first and second outer wires Rl1 to Rl3 and Tl1 to Tl3 are disposed adjacent to each other may arise. In more detail, the first and second outermost touch electrodes Rx4_1 to Rx4_3, Tx1_1 to Tx3_1 adjacent to the circular boundary may be respectively connected to the first and second outer wires Rl1 to Rl3 and Tl1 to Tl3. At this point, even when the first outer wires Rl1 to Rl3 are disposed in a group and the second outer wires Tl1 to Tl3 are disposed in a group, a plurality of areas where the first and second outer wires Rl1 to Rl3 and Tl1 to Tl3 are disposed adjacent to each other may arise. The reason is that all the outermost touch electrodes Rx4_1 to Rx4_3 and Tx1_1 to Tx3_1 need to be connected to the driving unit DIC. As a result, the coupling phenomenon occurs so that the touch sensitivity of the touch screen panel TSP may be deteriorated. Additionally, due to an inefficient wire arrangement, a size of the bezel may increase.

Hereinafter, an arrangement scheme of the first and second outer wires Rl1 to Rl3 and Tl1 to Tl3 to minimize the coupling phenomenon will be described for the touch recognition area 20 having boundaries that are not parallel to the first or second direction D1 or D2. For convenience of description, a circular touch recognition area 20 including 21 first touch electrodes Rx1_1 to Rx5_3 and 21 second touch electrodes Tx1_1 to Tx6_2 is mainly described. However, description below may be applied to a touch screen panel TSP including various numbers of the first and second touch electrodes Rx1_1 to Rx5_3 and Tx1_1 to Tx6_2 and differently shaped areas. Additionally, the touch screen panel TSP in this specification is not limited to the embodiments shown in FIGS. 2 to 5.

FIGS. 2 to 5 are plan views of a touch screen panel including a circular touch recognition area.

Referring to FIGS. 2 to 5, the touch recognition area 20 may be divided into first to fourth areas A1 to A4 on the basis of first and second reference line l1 and l2. The first reference line l1 is an imaginary line passing a weight center M of the touch recognition area 20 and parallel to the first direction D1. The second reference line l2 is an imaginary line passing the weight center M of the touch recognition area 20 and parallel to the second direction D2. As used herein, a weight center of the touch screen recognition area is to mean a central point relative to a number of outer wires connected to each of the first to fourth areas A1 to A4, each area only having only one type of outer wires, i.e., Rl or Tl outer wires, connected to corresponding respective touch electrodes therein, with adjacent areas having outer wires of different types alternately disposed.

The first to fourth areas A1 to A4 divided by the first and second reference line l1 and l2 may be adjacent to each other. The first and second area A1 and A3 may face each other on the basis of the weight center M of the touch recognition area 20. The second and fourth area A2 and A4 may face each other on the basis of the weight center M of the touch recognition area 20.

The first outer wires Rl1 to Rl5 may connect the first outermost touch electrodes Rx1_2, Rx1_1, Rx2_1, Rx5_3, and Rx4_5 in the first and second area A1 and A3 and the driving unit DIC. The second outer wires Tl1 to Tl6 may connect the second outermost touch electrodes Tx1_2, Tx2_4, Tx3_5, Tx4_1, Tx5_1, and Tx6_1 in the second and fourth area A2 and A4 and the driving unit DIC.

Since the touch recognition area 20 is divided into the four areas A1 to A4 and outer wires performing the same function on the outermost touch electrodes in the facing areas A1-A3 and A2-A4 are disposed, the adjacency between the first and second outer wires is minimized and the size of the bezel is reduced at the same time.

Figure 2:
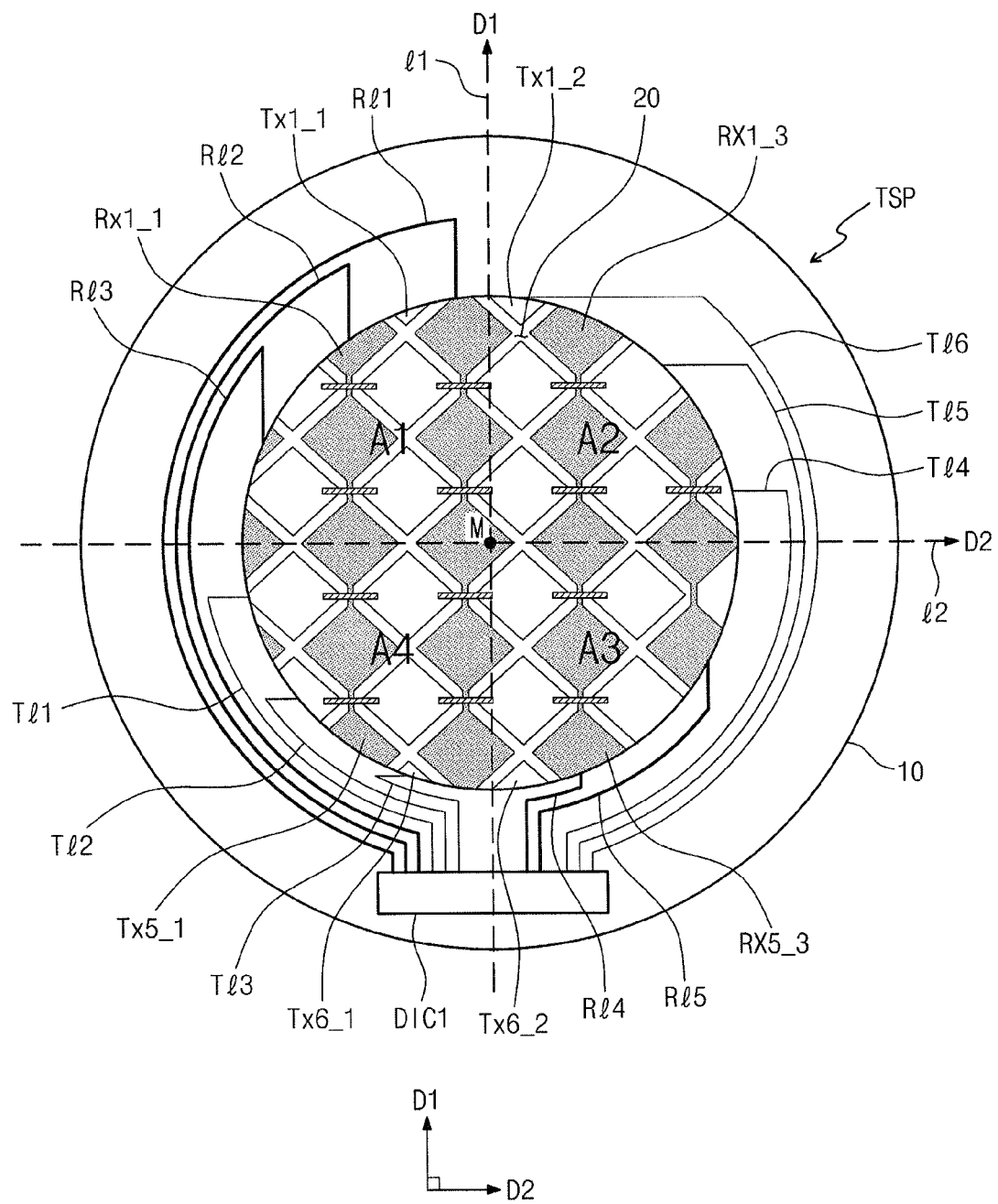
FIGS. 2 to 5 illustrate plan views of a touch screen panel including a circular touch recognition area.
Figure 3:
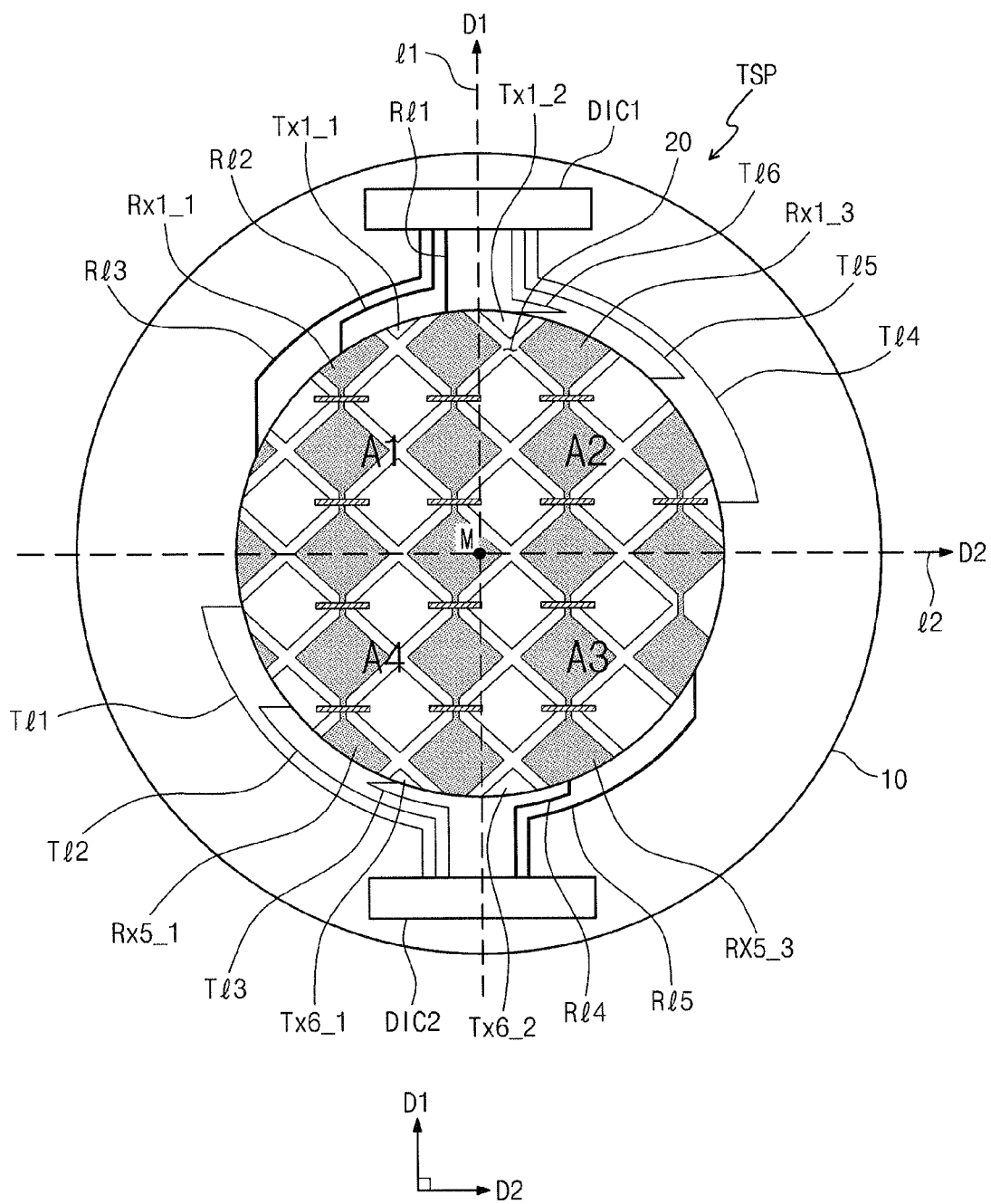

Relative to an imaginary line connecting the weight center M of the touch recognition area 20 and a weight center of the driving unit DIC, the first or second direction D1 or D2 may be or may not be parallel to the imaginary line. The imaginary line would extend from the weight center M to a center of the driving unit DIC. When the imaginary line is parallel to the first or second direction D1 or D2, the first and second directions D1 and D2 may be a horizontal-vertical direction relative to the position of the driving unit DIC. When the imaginary line is not parallel to the first and second direction D1 and D2, the first and second direction D1 and D2 may be a diagonal direction relative to the position of the driving unit DIC. In FIGS. 2 and 3, this imaginary line would correspond to D1 as shown therein. This imaginary line I would remain the same for FIGS. 4 and 5 as in FIGS. 2 and 3.

The embodiment that the first or second direction D1 or D2 is parallel to the imaginary line will be described later with reference to FIGS. 2 and 3. Additionally, the embodiment that the first and second direction D1 and D2 are not parallel to the imaginary line will be described later with reference to FIGS. 4 and 5.

Referring to FIG. 2, when the driving unit DIC includes a first driving chip DIC1, the first direction D1 may be parallel to a direction from the weight center of the first driving chip DIC1 to the weight center M of the touch recognition area 20. Or, when the driving unit DIC includes the first driving chip DIC1, the first direction D1 may be parallel to an imaginary line connecting the weight center of the first driving chip DIC1 and the weight center M of the touch recognition area 20. In this case, the second direction D2 may be vertical (orthogonal) to the first direction D1.

Referring to FIG. 3, the driving unit DIC may include a first and second driving chip DIC1 and DIC2 disposed to face each other in the non-recognition area 10. In this case, the first direction D1 may be parallel to a direction from the weight center M of the touch recognition area 20 to the weight center of the first driving chip DIC1. Alternatively, the first direction D1 may be parallel to a direction from the weight center of the second driving chip DIC2 to the weight center M of the touch recognition area 20. That is, the first direction D1 may be parallel to an imaginary line connecting the weight center of the first or second driving chip DIC1 or DIC2 and the weight center M of the touch recognition area 20. In this case, the second direction D2 may be vertical (orthogonal) to the first direction D1.

The touch recognition area 20 may be separated into four areas A1 to A4 by the first and second reference line l1 and l2 divided in the first and second direction D1 and D2 on the basis of the driving unit DIC. For example, the first area A1 may be the left upper area. The second area A2 may be the right upper area. The third area A3 may be the right lower area. The fourth area A4 may be the left lower area. The first outer wires Rl1 to Rl5 may be connected to the first outermost touch electrodes Rx1_2, Rx1_1, Rx2_1, Rx5_3, and Rx4_5 in the first and third area A1 and A3 and the second outer wires Tl1 to Tl6 may be connected to the second outermost touch electrodes Rx1_2, Rx1_1, Rx2_1, Rx5_3, and Rx4_5 in the second and fourth area A2 and A4.

When the driving unit DIC includes only the first driving chip DIC1, the first and second outer wires Rl1 to Rl5 and Tl1 to Tl6 may be connected to the first driving chip DIC1 (see FIG. 2). However, when the driving unit DIC includes a plurality of driving chips DIC1 and DIC2, the first and second outer wires Rl1 to Rl5 and Tl1 to Tl6 may be connected to a driving chip adjacent thereto. As the outer wires Rl1 to Rl5 and Tl1 to Tl6 are connected to an adjacent driving chip, the lengths of the outer wires Rl1 to Rl5 and Tl1 to Tl6 and the areas where the outer wires Rl1 to Rl5 and Tl1 to Tl6 are disposed may be reduced.

For example, as shown in FIG. 3, the first driving chip DIC1 may be disposed adjacent to the first and second area A1 and A2 and the second driving chip DIC2 may be disposed adjacent to the third and fourth area A3 and A4. In this case, the first and second outer wires Rl1 to Rl3 and Tl4 to Tl6 connecting the outermost touch electrodes Rx1_2, Rx1_1, Rx2_1, Tx1_2, Tx2_4, and Tx3_5 in the first and second area A1 and A2 may be connected to the first driving chip DIC1. In this case, the first and second outer wires Tl1 to Tl3 and Rl4 to Rl5 connecting the outermost touch electrodes Rx5_3, Rx4_5, Tx4_1, Tx5_1, and Tx6_1 in the third and fourth area A3 and A4 may be connected to the second driving chip DIC2.

Figure 4:
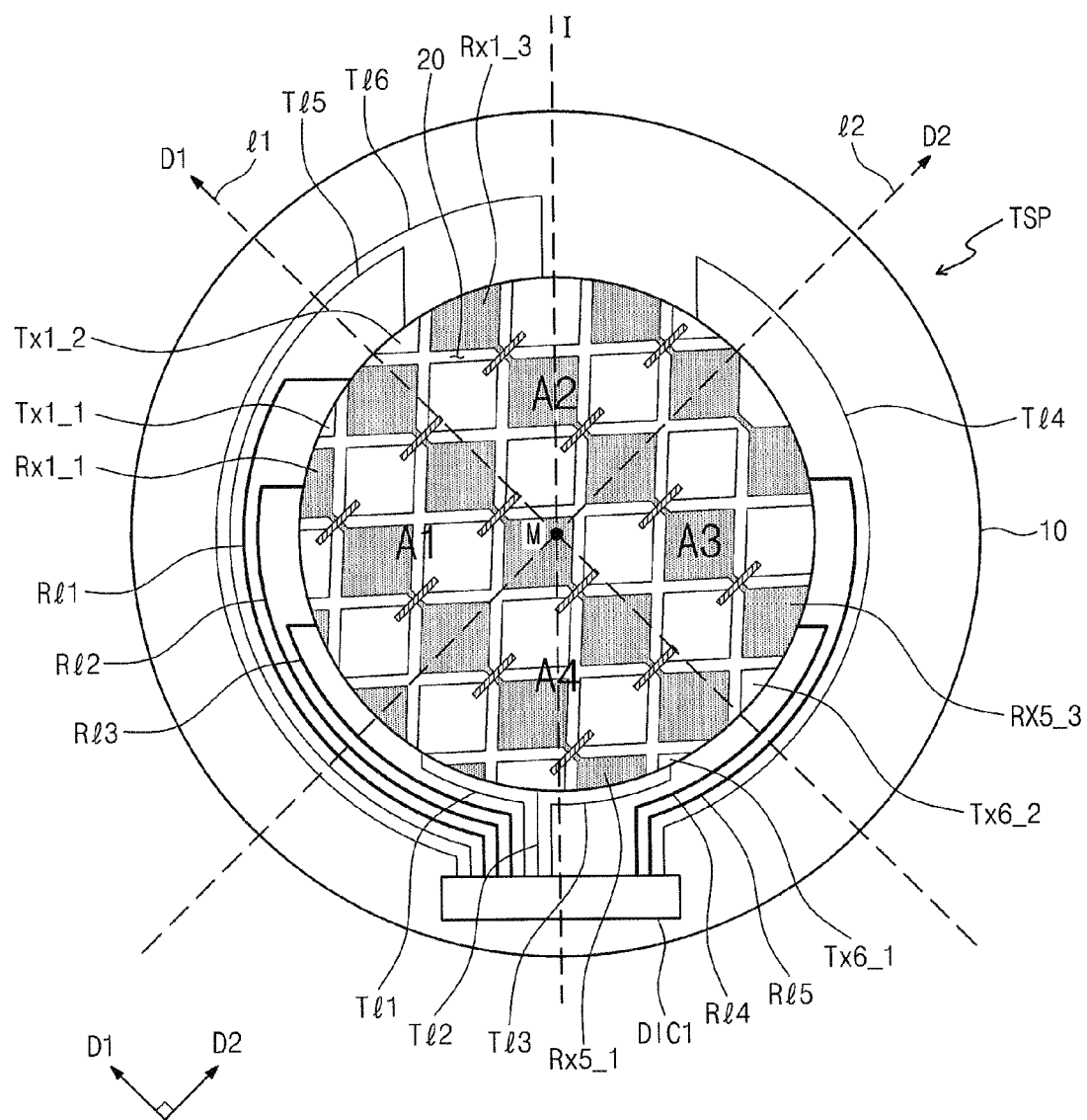

Referring to FIG. 4, when the driving unit DIC includes only the first driving chip DIC1, the first direction D1 may not be parallel to a direction from the weight center of the first driving chip DIC1 to the weight center M of the touch recognition area 20. Or, when the driving unit DIC includes the first driving chip DIC1, the first direction D1 may not be parallel to the imaginary line I connecting the weight center of the first driving chip DIC1 and the weight center M of the touch recognition area 20. In this case, the second direction D2 may be vertical (orthogonal) to the first direction D1.

Figure 5:
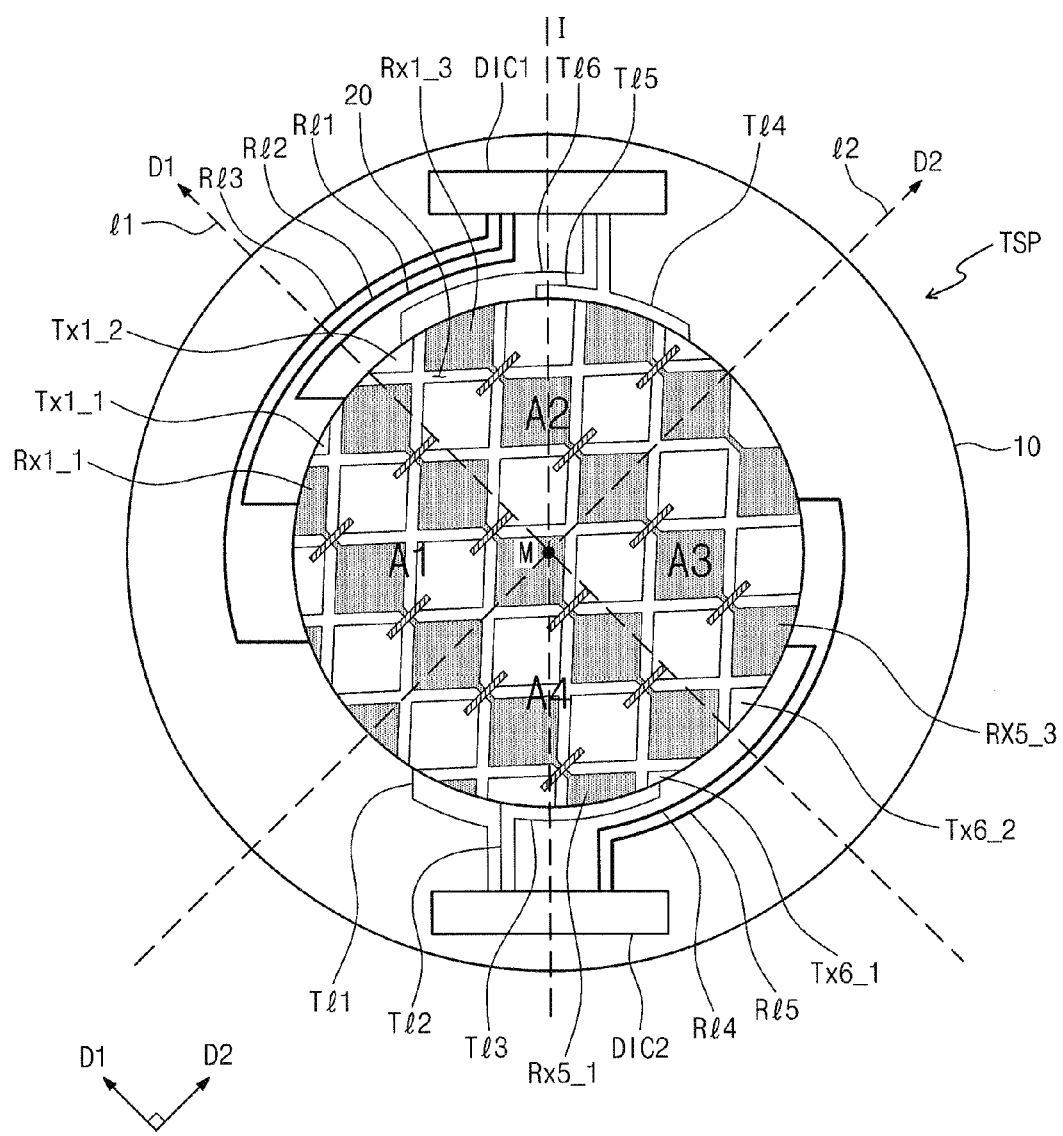

Referring to FIG. 5, the driving unit DIC may include a first and second driving chip DIC1 and DIC2 disposed to face each other in the non-recognition area 10. In this case, the first direction D1 may not be parallel to a direction from the weight center M of the touch recognition area 20 to the weight center of the first driving chip DIC1. Or, the first direction D1 may not be parallel to a direction from the weight center of the second driving chip DIC2 to the weight center M of the touch recognition area 20. That is, the first direction D1 may not be parallel to the imaginary line I connecting the weight center of the first or second driving chip DIC1 or DIC2 and the weight center M of the touch recognition area 20. In this case, the second direction D2 may be vertical (orthogonal) to the first direction D1.

The touch recognition area 20 may be separated into four areas Al to A4 by the first and second reference line l1 and l2 divided in the first and second direction D1 and D2 on the basis of the driving unit DIC. For example, the first area A1 may be the left area. The second area A2 may be the upper area. The third area A3 may be the right area. The fourth area A4 may be the lower area. The first outer wires Rl1 to Rl5 may be connected to the first outermost touch electrodes Rx1_1, Rx1_2, Rx2_1, Rx4_5, and Rx5_3 in the first and third area A1 and A3 and the second outer wires Tl1 to Tl6 may be connected to the second outermost touch electrodes Tx1_2, Tx2_4, Tx3_5, Tx4_1, Tx5_1, and Tx6_1 in the second and fourth area A2 and A4.

When the driving unit DIC includes only the first driving chip DIC1, the first and second outer wires Rl1 to Rl5 and Tl1 to Tl6 may be connected to the first driving chip DIC1 (see FIG. 4). However, when the driving unit DIC includes a plurality of driving chips DIC1 and DIC2, the first and second outer wires Rl1 to Rl5 and Tl1 to Tl6 may be connected to a driving chip adjacent thereto.

For example, as shown in FIG. 5, the first driving chip DIC1 may be disposed adjacent to the second area A2 and the second driving chip DIC2 may be disposed adjacent to the fourth area A4. In this case, the first and second outer wires Rl1 to Rl3 and Tl4 to Tl6 connecting the outermost touch electrodes Rx1_2, Rx1_1, Rx2_1, Tx1_2, Tx2_4, and Tx3_5 in the first and second area A1 and A2 may be connected to the first driving chip DIC1. In this case, the first and second outer wires Tl1 to Tl3 and Rl4 to Rl5 connecting the outermost touch electrodes Rx5_3, Rx4_5, Tx4_1, Tx5_1, and Tx6_1 in the third and fourth area A3 and A4 may be connected to the second driving chip DIC2.

Figure 6A:
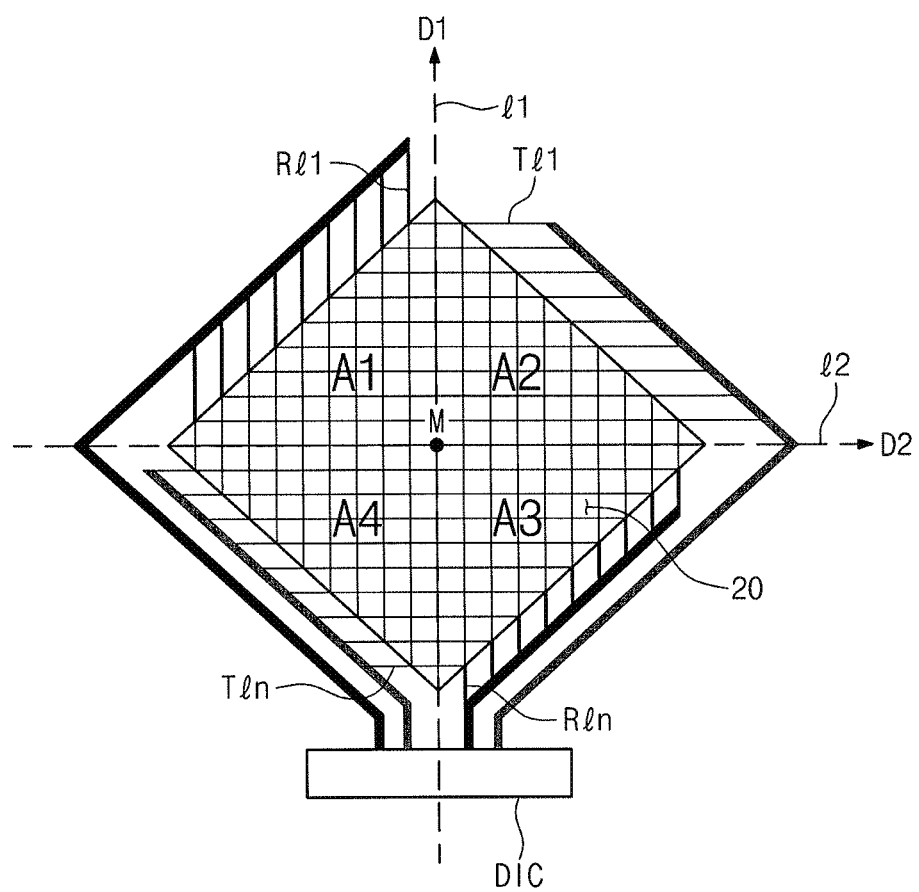
FIG. 6A illustrates a plan view of a touch screen panel including a rhombic touch recognition area.
Figure 6B:
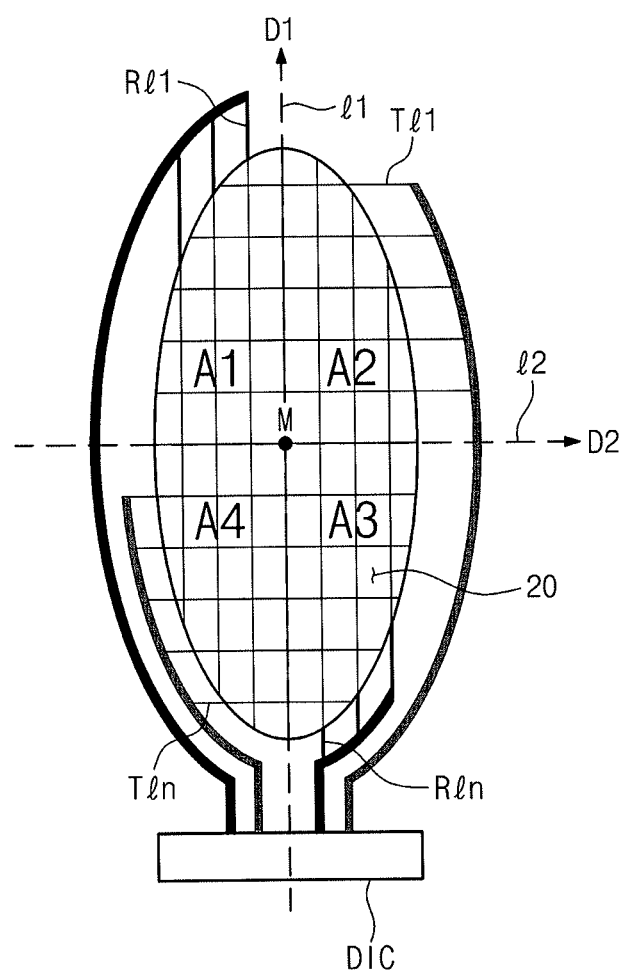
FIG. 6B is a plan view of a touch screen panel including an oval touch recognition area.

FIG. 6A is a plan view of a touch screen panel including a rhombic touch recognition area. FIG. 6B is a plan view of a touch screen panel including an oval touch recognition area. For convenience of description, it is shown that each of outer wires is connected to one wire and is connected to a driving unit through the wire. However, each outer wire may be directly connected to a driving unit and may not be connected to one wire as shown in the drawing.

Referring to FIGS. 6A and 6B, the above contents described with reference to FIGS. 2 to 5 may be applied to the rhombic or oval touch recognition area 20. Accordingly, the rhombic or oval touch recognition area 20 having the boundary not parallel to the first and second direction D1 and D2 may be also separated into four areas A1 to A4 on the basis of the first and second reference line l1 and l2. At this point, the first outermost touch electrodes in the facing first and third area A1 and A3 may be connected to the first outer wires Rl1 to Rln. Additionally, the second outermost touch electrodes in the facing second and fourth area A2 and A4 may be connected to the second outer wires Tl1 to Tln.

Thus, all touch electrodes in the touch recognition area 20 may be electrically connected to the driving unit DIC and an area where the first and second outer wires Rl1 to Rln and Tl1 to Tln are adjacent to each other may be minimized.

Figure 7:
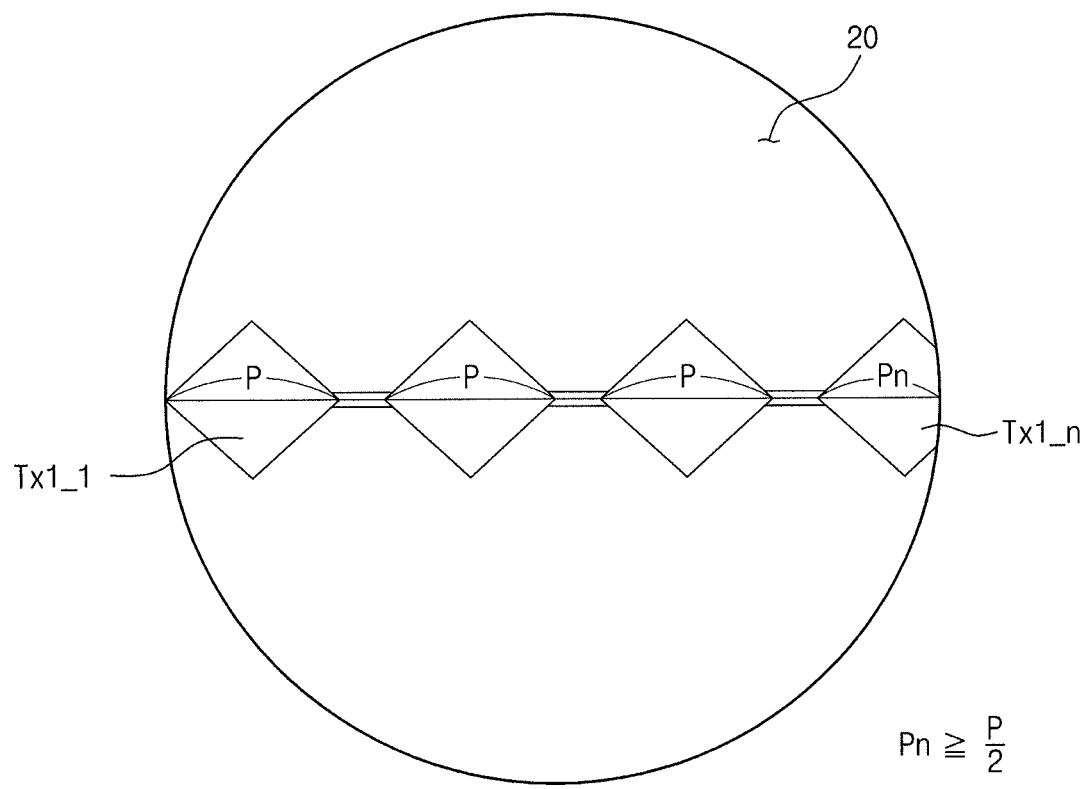
FIG. 7 illustrates a plan view of a touch recognition area including n touch electrodes.

FIG. 7 is a plan view of a touch recognition area including n touch electrodes.

Referring to FIG. 7, the touch recognition area 20 may include n touch electrodes Tx1_1 to Tx1_n. At this point, the outermost touch electrode Tx1_n at the outermost of the touch recognition area 20 among the n touch electrodes Tx1_1 to Tx1_n may exist. The outermost touch electrode Tx1_n may have a length greater than or equal to ½ of the length P of each of the other touch electrodes Tx1_1 to Tx1_(n−1). That is, when the length of the outermost touch electrode Tx1_n is Pn and the length of other touch electrodes Tx1_1 to Tx1_(n−1) is P, Pn satisfies the following Equation 1.

$$Pn \geq p/2 \qquad \text{<Equation 1>}$$

This is for obtaining a sufficient area for allowing the outermost touch electrode Tx1_n to be connected to an outer wire and forming a capacitance with other touch electrodes.

By way of summation and review, embodiments provides a touch screen panel structure in which outer wires connecting touch detection electrodes and a driving chip are disposed alternately by each area to minimize a coupling interference between a bezel and the outer wires of a touch screen panel.

By preventing outer wires having different characteristics from being disposed adjacent to each other, a coupling phenomenon between the outer wires may be prevented in advance. Additionally, since a touch recognition area is divided into four areas and the outer wires are alternately disposed in the divided four areas, the bezel may be reduced.

Additionally, a length, a direction, a form, and a position in this specification may all mean substantial values and may allow a predetermined error range.

For convenience of description, each drawing is described separately but it is possible to implement a new embodiment by combining the embodiments described with reference to each drawing. In relation to the above-described display device, the configurations and methods of the above-described embodiments are applied without limitations and in order to provide various modifications, and some or all of embodiments may be selectively combined and configured.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A touch screen panel, comprising:
a touch recognition area that recognizes a touch input; and
a non-recognition area that does not recognize the touch input,
wherein the touch recognition area includes first touch electrodes connected in a first direction and second touch electrodes connected in a second direction orthogonal to the first direction, the first touch electrodes and the second touch electrodes being capacitively coupled to each other to detect the touch input,
wherein the non-recognition area includes a driver to obtain coordinate information of the touch input using the first and second touch electrodes, and outer wires connecting the first and second touch electrodes to the driver,
wherein the touch recognition area is divided into first to fourth areas based on a first reference line and a second reference line,
wherein the first reference line passes through a weight center of the touch recognition area and divides the touch recognition area in the first direction, and the second reference line passes through the weight center and divides the touch recognition area in the second direction, wherein the first and third areas face and are spaced apart from each other based on the weight center, and the second and fourth areas face and are spaced apart from each other based on the weight center, wherein the outer wires include first outer wires connecting first outermost touch electrodes, among the first touch electrodes, at outermost of the first and third areas to the driver; and second outer wires connecting second outermost touch electrodes, among the second touch electrodes, at outermost of the second and fourth areas to the driver, and wherein the second outer wires connected to the second touch electrodes, which are in one of the second and the fourth areas, are between one group of the first outer wires connected to the first outermost touch electrodes, which are in the first area, and another group of the first outer wires connected to the first outermost touch electrodes, which are in the third area in a direction in which the outermost of the first, second, third, and fourth areas extend.

2. The panel as claimed in claim 1, wherein boundaries of the touch recognition area and the non-recognition area are not parallel to the first and second reference lines.

3. The panel as claimed in claim 2, wherein the touch recognition area has one of a circular form, an oval form, a rhombic form, and a hexagonal form.

4. The panel as claimed in claim 1, further comprising:
first connection parts connecting the first touch electrodes in the first direction; and
second connection parts connecting the second touch electrodes in the second direction.

5. The panel as claimed in claim 4, wherein
first touch electrodes connected by the first connection parts are arranged in the second direction; and
second touch electrodes connected by the second connection parts are arranged in the first direction.

6. The panel as claimed in claim 5, wherein the first or second direction is or is not parallel to an imaginary line connecting a weight center of the driver and the weight center of the touch recognition area.

7. The panel as claimed in claim 5, wherein the second touch electrodes, the first connection parts, and the first touch electrodes are on a same layer; and
the first connection part and the first and second touch electrodes are covered by a blocking layer.

8. The panel as claimed in claim 7, wherein the second connection parts are disposed on the blocking layer and the second touch electrodes are connected in the second direction through contact holes penetrating the blocking layer.

9. The panel as claimed in claim 5, wherein first touch electrodes connected by the first connection parts and second touch electrodes connected by the second connection parts are on different layers.

10. The panel as claimed in claim 1, wherein the driver includes a first driving chip transmitting scan signals to the first touch electrodes and receiving detection signals corresponding to the scan signals from the second touch electrodes.

11. The panel as claimed in claim 10, wherein:
the first outer wires connect the first outermost touch electrodes and the first driving chip, and
the second outer wires connect the second outermost touch electrodes and the first driving chip.

12. The panel as claimed in claim 10, wherein the driver further includes a second driving chip at a different position than the first driving chip in the non-recognition area.

13. The panel as claimed in claim 12, wherein the first driving chip and the second driving chip face each other based on the touch recognition area.

14. The panel as claimed in claim 13, wherein:
first outer wires of the first area and second outer wires of the second area are connected to the first driving chip at a position adjacent to the first and second area; and
first outer wires of the third area and second outer wires of the fourth area are connected to the second driving chip at a position adjacent to the third and fourth areas.

15. The panel as claimed in claim 1, wherein lengths of the first or second outermost touch electrodes are greater than or identical to ½ of a length of a first or second touch electrode not disposed at the outermost of the first to fourth areas.

16. The panel as claimed in claim 1, wherein the first and second touch electrodes are on a same surface of the touch recognition area.

17. The panel as claimed in claim 16, wherein the first and second outer wires are on a same surface of the non-recognition area.

18. The panel as claimed in claim 1, wherein the first outer wires connect the first and third areas, which are arranged diagonally with respect to each other, and the second outer wires connect the second and fourth areas, which are arranged diagonally with respect to each other.

19. The panel as claimed in claim 18, wherein the first and third areas are arranged alternately with the second and fourth areas.

20. The panel as claimed in claim 1, wherein boundaries of the touch recognition area and the non-recognition area are non-linear, and wherein
the first and second outer wires extend along the non-linear boundaries of the touch recognition area and the non-recognition area to parallel the non-linear boundaries of the touch recognition area and the non-recognition area.

* * * * *